(12) United States Patent
Vlot et al.

(10) Patent No.: US 9,740,834 B2
(45) Date of Patent: Aug. 22, 2017

(54) USAGE RIGHTS INFORMATION FOR PROTECTED CONTENT HAVING TWO PARTS

(71) Applicant: Vodafone GmbH, Düsseldorf (DE)

(72) Inventors: Marnix Vlot, Düsseldorf (DE); Christoph Schaaf, Düsseldorf (DE)

(73) Assignee: Vodafone GmbH (DE)

( * ) Notice: Subject to any disclaimer, the term of this patent is extended or adjusted under 35 U.S.C. 154(b) by 0 days.

(21) Appl. No.: 14/836,364

(22) Filed: Aug. 26, 2015

(65) Prior Publication Data

US 2016/0065586 A1 Mar. 3, 2016

(30) Foreign Application Priority Data

Aug. 28, 2014 (EP) ..................................... 14182725

(51) Int. Cl.
*G06F 21/10* (2013.01)
*H04L 29/06* (2006.01)

(52) U.S. Cl.
CPC ............ *G06F 21/10* (2013.01); *H04L 63/105* (2013.01); *G06F 2221/0773* (2013.01)

(58) Field of Classification Search
CPC ...................................................... G06F 21/10
See application file for complete search history.

(56) References Cited

U.S. PATENT DOCUMENTS

| 8,336,105 | B2 * | 12/2012 | Hartung | ................... | G06F 21/10 |
| | | | | | 713/194 |
| 2003/0174838 | A1 * | 9/2003 | Bremer | ............... | H04L 63/0428 |
| | | | | | 380/270 |
| 2006/0089912 | A1 * | 4/2006 | Spagna | ................... | G06F 21/10 |
| | | | | | 705/51 |
| 2007/0033414 | A1 * | 2/2007 | Dunko | ................... | G06F 21/10 |
| | | | | | 713/186 |
| 2007/0079381 | A1 * | 4/2007 | Hartung | ................... | G06F 21/10 |
| | | | | | 726/26 |

(Continued)

OTHER PUBLICATIONS

Liu et al.; Digital rights management for content distribution; Published in: Proceeding ACSW Frontiers '03 Proceedings of the Australasian information security workshop conference on ACSW frontiers 2003—vol. 21; pp. 49-58; ACM Digital Library.*

(Continued)

*Primary Examiner* — Bradley Holder
(74) *Attorney, Agent, or Firm* — Innovation Counsel LLP (57) ABSTRACT

The invention relates to a device for accessing protected content, the device comprising a secure module for accessing the protected content and a control unit external to the secure module for controlling access operations for the protected content. The device is configured to receive usage rights data for the protected content, the usage rights data including first and second usage rights data defining permissions for uses of the protected content, and the device is configured to enable a requested use of the protected content upon a check whether the use is permitted by usage rights data, the check being made in the secure module based on to the first usage rights data and the check being made in the control unit based on the second usage rights data. Moreover, the invention relates to a method for operating the device.

14 Claims, 1 Drawing Sheet

(56) References Cited

U.S. PATENT DOCUMENTS

| | | | |
|---|---|---|---|
| 2008/0148067 A1* | 6/2008 | Sitrick | H04L 9/0861 713/193 |
| 2008/0260351 A1* | 10/2008 | Li | G06F 21/10 386/252 |
| 2011/0075841 A1* | 3/2011 | Chen | H04N 21/2347 380/200 |
| 2013/0205401 A1* | 8/2013 | Lin | G06F 21/10 726/26 |
| 2013/0205402 A1* | 8/2013 | Lin | G06F 21/10 726/26 |
| 2014/0289507 A1* | 9/2014 | Sitrick | H04L 9/0861 713/150 |

OTHER PUBLICATIONS

Schneider et al.; A robust content based digital signature for image authentication; Published in: Image Processing, 1996, Proceedings., International Conference on; Date of Conference: Sep. 19-19, 1996; IEEE Xplore.*

* cited by examiner

USAGE RIGHTS INFORMATION FOR PROTECTED CONTENT HAVING TWO PARTS

CROSS-REFERENCE TO RELATED APPLICATIONS

This application claims benefit of priority to European Patent Application No. EP14182725 filed on Aug. 28, 2014, the entire contents of which is incorporated herein by reference.

BACKGROUND OF THE INVENTION

The invention relates to content protection systems which allow for distributing and accessing protected content. Most specifically, the invention relates to a device for accessing protected content and to a method for operating such a device.

Content protection systems are essential with respect to the distribution of digital content via digital broadcast or through other channels. In such content protection systems, content is encrypted or scrambled (commonly referred to as encryption herein) before it is sent to the users of system, and the users decrypt or descramble (commonly referred to as decryption herein) the encrypted content in order to render the content. The cryptographic information which is necessary for decrypting the content is provided to authorized users in a secure manner so that only such users are able to access and render the protected content.

In addition, usage rights may be defined for the protected content, which define permitted uses of the protected content. The usage rights may be specified in usage rights information which can be provided to the users of the content in addition to the content itself and the cryptographic information for decrypting the content. By means of such usage rights information, it can e.g. be specified whether or not the users are permitted to store the content for a future playback or whether they are allowed to forward the protected content from their main devices for receiving the content to further devices.

In order to provide a high security against unauthorized accesses to the protected content, user devices for accessing protected content may dispose of secure hardware modules for decrypting the content. These hardware modules may be separated from the remaining hardware of the user devices and may particularly provide a special hardware security architecture for protecting the information used therein and the processes carried out therein.

In user devices disposing of such a secure hardware module, a secure processing of the content in accordance with the usage rights information can be ensured when the usage rights information are likewise processed in the secure hardware module. However, it is typically only possible to provide few basic usage rights information when this information is processed in a secure hardware module, because it is usually not possible to implement in the secure hardware block complex functionality for evaluating usage rights information without affecting the security of the hardware module against tampering. Such basic URI information do typically not meet the requirements of content providers that do often want to specify more complex usage rights in order to be able to flexibly control the use of their content.

BRIEF DESCRIPTION OF THE INVENTION

Therefore it is an object of the present invention to allow for defining more complex usage rights without affecting the security provided when the usage rights information is processed in a secure hardware module.

The object is achieved by a device according to claim 1 and by a method according to claim 15. Embodiments of the device and the method are given in the depended claims.

According to a first aspect, the invention suggests a device for accessing protected content. The device comprises a secure module for accessing the protected content and a control unit external to the secure module for controlling access operations for the protected content. The device is configured to receive usage rights data for the protected content, the usage rights data including first and second usage rights data defining permissions for uses of the protected content. Moreover, the device is configured to enable a requested use of the protected content upon a check whether the use is permitted by the usage rights data, the check being made in the secure module based on the first usage rights data and the check be made in the control unit based on the second usage rights data.

According to a further aspect, the invention suggests a method for operating a device for accessing protected content. The device comprises a secure module for accessing the protected content and a control unit external to the secure module for controlling access operations for the protected content. The method comprises the steps of (i) receiving usage rights data for the protected content, the usage rights data including first and second usage rights data defining permissions for uses of the protected content, and (ii) enabling a requested use of the protected upon a check whether the use is permitted by the usage rights data, the check being made in the secure module based on to the first usage rights data and the check being made in the control unit based on the second usage rights data.

It is an advantage of the present invention that a two-layer hierarchy of the usage rights data is provided. In a first layer, first usage rights data can be processed in the secure module in an especially secure manner. In the second layer, second usage rights data can additionally be processed in the control unit. Hereby, it is possible to add usage rights definitions which cannot be processed in the secure module due to its limitation with respect to the complexity of the supported operations. In particular, the first usage rights data may correspond to basic usage rights which can be handled in the secure module without having to implement therein complex functionality that would affect its security. The second usage rights data may define more complex usage rights which require more complex functionality that can be implemented in the device outside the secure module.

In one embodiment of the device and the method, the device is configured such that the check performed in the secure module based on the first usage rights data is made subsequent to the check in the control unit performed based on the second usage rights data. Moreover, the check performed in the secure module based on the first usage rights data may only be made, if the check performed in the control unit based on the second usage rights data is affirmative (i.e. results in a determination that the requested use is permitted). These embodiments allow for an efficient check whether a requested use is permitted by the first and second usage rights data.

The control unit does usually receive commands of the user of the device which correspond to a certain use of a protected content. When the control unit determines on the basis of the second usage rights data, that the requested use is permitted, it can control the secure module to perform corresponding access operations for the content by transmitting a corresponding instruction to the secure module. In the aforementioned embodiments, such an instruction is not transmitted to the secure module in case the control unit determines that the requested use is not permitted by the usage rights data.

In a further embodiment of the device and the method, the control unit is configured to perform a first check whether the use is permitted based on the first usage rights data and the secure module is configured to perform a subsequent second check whether the use is permitted based on the first usage rights data, the use being enabled if the first and second checks are affirmative. In a related embodiment, the device is configured to block the use, if one of the first and second checks is negative, where the second check is only made if the first check is affirmative.

In these embodiments, the control unit does not only check whether the requested use is permitted on the basis of the second usage rights data, but also on the basis of the first usage rights data. If the control unit determines that a use is not permitted by the first or second usage rights data, it may not instruct the secure module to decrypt or otherwise process the protected content. The further check by the secure module whether the requested use is permitted by the first usage rights data serves as a secure fallback position in case the control unit has not correctly determined missing authorization to execute the required use on the basis of the first usage rights data (e.g. due to a manipulation of the control unit or the usage rights data held therein).

In a further embodiment of the device and the method, the secure module is configured to validate the first and second usage rights data and to forward at least the second usage rights data to the control unit upon a successful validation of the first and second usage rights data. Preferably, the validation includes a verification of the authenticity and integrity of the first and second usage rights data. By configuring the device in such a way that the validation is made in the secure module, the reliability of the validation can be increased. Further, the secure module typically supports functionality for carrying out the validation of other data, and such functionality can also be used in this embodiment for the validation of the usage rights data.

Moreover, one embodiment of the device and the method provides that the first usage rights data define permissions for a predetermined set of uses of the content, that the uses corresponding to a predetermine set of states of the secure module, and that the set of states cannot be modified. In particular, the set of states may be part of the program routines which are securely implemented in the secure module and which cannot be modified from outside the secure module. In one implementation, such program routines may be implemented in the secure module at the time of manufacturing the secure module in a secure manner.

In contrast, the control unit may be implemented as a software executed in the device which can particularly be modified during the operation of the device. Thus, it is also possible to modify the control unit with respect to the definition and/or processing of the second usage rights data.

In a further embodiment of the device and the method, the secure module is configured to modify the first usage rights data in response to an access operation for the content carried out in the device. In addition, an embodiment provides that the control unit is configured to modify the second usage rights data in response to access operation for the content carried out in the device. Such changes of the first or second usage rights data may particularly be made when the usage rights data define a maximum number of times a certain access operation is permitted to be carried out. Hereby, it is ensured that the usage rights data reflect the current usage rights for the protected content.

Moreover, one embodiment of the device and the method provides that the control unit is configured to send an instruction to modify the first usage rights data to the secure module, and wherein the secure module is configured to modify the first usage rights data in accordance with the instruction. Hereby, it also possible for the control unit to effect a change of the first usage rights data held in the secure module. Such changes may particular be made in response to certain uses of the protected content monitored by the control unit. For example, the control unit may keep track of a number of storage operations for the content. When a maximum number of storage operations has been carried out, which number may be defined in the second usage rights data, the control unit may effect a change of the first usage rights data that storage of the content is no longer permitted.

Furthermore, one embodiment of the device and the method provides that the secure module is capable of exporting the content in accordance with a first export mode for storing the content in the device and in accordance with a second export mode for forwarding the content to a further device, and that the device is configured to modify the first and/or second usage rights data in dependence of a selected mode for exporting the content. The modification may be initiated by the secure module, when it determines that the content is exported in accordance with a certain export mode. Likewise, the control unit may be configured to initiate the modification and to send a corresponding instruction for effecting the modification to the secure module. One example of such a modification is a change from usage rights data allowing to store on copy of the content and to forward the content to another device to usage rights data only allowing the forwarding of the content. Such modification may be made in response to a storage operation for storing the content.

Preferably, the export of the content involves a re-encryption of the content in the secure module, and the content is exported in a re-encrypted form. The modification of the first part of the URI in dependence of the export mode may be made by a re-encryption module for re-encrypting the content for export, where the re-encryption module may be included in the secure module.

In a further embodiment, the states of the secure module corresponding to the first usage rights data are ordered, and wherein the secure module is configured to modify the first usage rights data when the modification includes a change to usage rights which correspond to a higher ordered state than a current state. The ordering of the states corresponding to the first usage rights data may be made such that more restrictive states have a higher order than less restrictive states. By only allowing changes to usage rights which correspond to higher ordered states, it is prevented that the first usage rights data can be made less restrictive by a manipulated control unit, for example.

In one embodiment of the device and the method, the first part of the usage rights data defines at least one time limit for a permitted use, and wherein the secure module is adapted to retrieve time information from at least one predetermined time server and to check an expiration of the time limit using the time information. Hereby, it is particularly possible to monitor the expiration of time limits defined by the first part of the usage rights data in an especially secure manner.

In a related embodiment of the device and the method, the secure module comprises a plurality of units for accessing the protected content and wherein the units are configured to retrieve time information from different time servers. Thus, an individual time basis can be defined for each of the units for accessing the content. Such units may particularly comprise decryption units for decrypting the content. Each of these units may be assigned to one content provider and may be configured to decrypt content of this provider. In this configuration, the aforementioned embodiment allows for defining an individual time basis for each content provider.

BRIEF DESCRIPTION OF THE SEVERAL VIEWS OF THE DRAWING

The aforementioned and other aspects of the invention will also be apparent from and elucidated with reference to the embodiments described hereinafter making reference to the drawings in which.

DETAILED DESCRIPTION OF THE INVENTION

Figure 1:
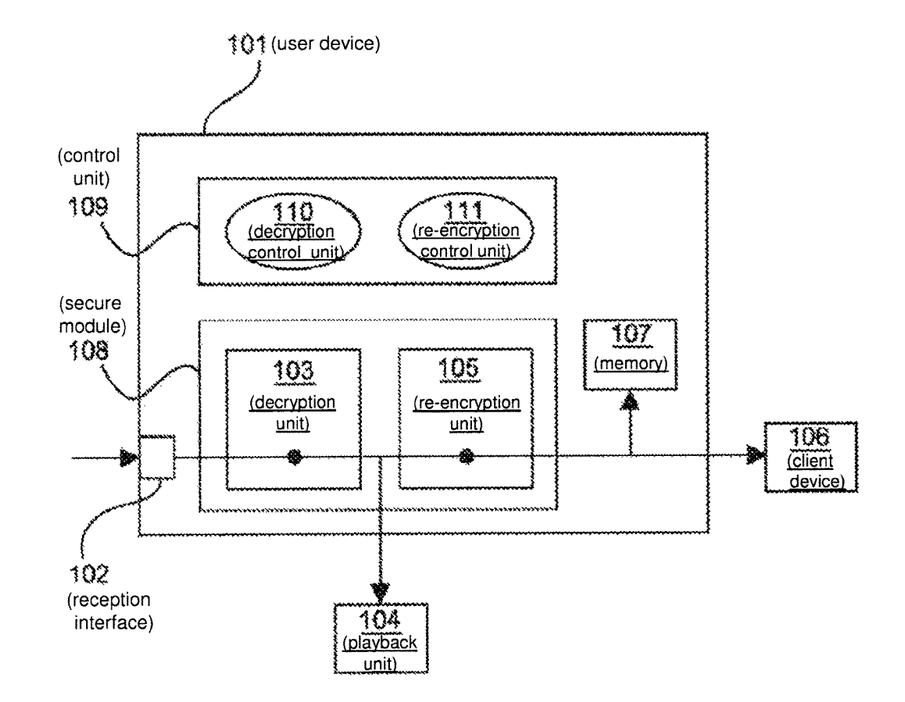
FIG. 1 is a schematic depiction of components of a device for accessing protected content.

FIG. 1 shows a user device 101 which is capable of accessing protected content and which may be configured as a set-top box, a module within a TV set or another appropriate consumer premises equipment (CPE). Although only one user device 101 is shown in FIG. 1, the same protected content may also be provided to further user devices 101 which are similarly configured.

The protected content may include audio and/or video programs, such as television programs, movies, pieces of music and the like. It may be transmitted to the user device 101 via a broadcast transmission channel, which may include a satellite broadcast channel, a cable broadcast channel and/or a terrestrial radio broadcast channel. When transmitted via a broadcast channel, the same content is simultaneously transmitted to a plurality of user device 101. In addition or as an alternative to a broadcast transmission, the protected content may be transmitted to the user device 101 individually upon request. In this case, the protect content, may be downloaded to the user device 101 via an Internet Protocol (IP)-based data network, for example.

The protected content is transmitted to the user device 101 in an encrypted and/or scrambled form (commonly referred to as encryption herein). In the user device 101, the protected content is descrambled or decrypted (commonly referred to as decryption herein) using a decryption key which is also referred to as control word. Examples of suitable encryption schemes for protecting the content are the ISO MPEG Common Encryption standard and the Digital Video Broadcast-Common Scrambling Algorithm (DVB-CSA). However, any other suitable encryption scheme known to a person skilled in the art may likewise be applied for protecting the content. The control word may be specified in a message transmitted to the user device 101 by the content provider in addition to the protected content. The message may be transmitted through the same transmission channel as the protected content in the form of a so-called Entitlement Control Message (ECM). In alternative embodiments, the control word may be specified in a message transmitted to the user device 101 via a different transmission channel.

The user device 101 receives the protected content at a reception interface 102 suitable for receiving the content through the used transmission channel. Within the user device 101, the protected content is forwarded to a decryption unit 103, which is capable of decrypting the protected content. For this purpose, the control word is provided to the decryption unit 103 in addition to the protected content. The control word may likewise be received at the reception interface 102 when transmitted via the same transmission channel as the protected content, or it may be received via another suitable reception interface of the user device 101 when it is transmitted through a separate transmission channel. After the protected content has been decrypted in the decryption unit 103 the user device 101 may provide the decrypted content for a direct playback. For this purpose, the decrypted content may be forwarded to a playback unit 104. The playback unit 104 may be a separate device directly coupled to the user device 101 through a suitable cable connection, such as, for example, an HDMI (High-Definition Multimedia Interface) connection, as shown in FIG. 1. This may particularly be the case when the user device 101 is configured as a set-top box. As an alternative, the user device 101 and the playback unit 104 may be components of an integrated apparatus, such as, for example a TV set. In this case, the decrypted content is forwarded to the playback unit 104 through an appropriate internal connection of the integrated apparatus. The playback unit 104 may particularly include a display unit for outputting audio content and/or loudspeakers or there like for outputting audio content.

In some embodiments, the user device 101 is additionally capable of providing the content for being accessed by one or more separate client devices 106 which are not directly coupled to the user device 101. Rather, the client devices 106 may be connected to the user device 101 via a data network. The client devices 106 may be configured as a further CPE and/or multimedia device and may access the content in order to render the content using an integrated playback unit 104 or a playback unit 104 coupled to the client device 106. In particular, the client devices 106 may be operated by the user of the user device 101 and may be connected to the user device 101 via local area network likewise operated by the user.

In addition or as an alternative, the user device is capable of storing received content in a memory 107 that is included in the user device 101 or detachably coupled thereto. In the latter case, the memory may comprise any suitable recording medium. Examples of such a recording medium include a detachable flash drive, a detachable hard disk drive and an optical recording medium. After having stored the content in the memory 107, the user device 101 may access the content at a later time in order render the content by means of the playback unit 104 or to forward the content to one or more client devices 106.

Both aforementioned applications are also referred to as export of the content herein, and the type of export, i.e. the forwarding to a client device 106 or the storage of the content in the memory 107, is also referred to as mode of the export. In both export modes, the content is re-encrypted in a re-encryption unit 105 of the user device 101 upon having been decrypted in the decryption unit 103 and exported in re-encrypted form. Thus, after the decryption unit 103 has decrypted the content, it forwards the content to the re-encryption unit 105 which re-encrypts the content before it is forwarded to the client device 106 or the memory 107. Preferably, the re-encryption is made on the basis of a new control word that differs from the control word used in the decryption unit 103 for decrypting the content. In addition, an encryption scheme may be used which is different from the encryption scheme used for protecting the content during transmission to the user device 101. In order to access the re-encrypted content, a client decryption unit is used in the user client device 106 (not shown in FIG. 1). For decrypting the re-encrypted content, the client decryption is provided with the control word, which may e.g. be sent from the re-encryption unit 105 to the client decryption unit in addition to the context. During transmission, the control word may be protected using a cryptographic key shared between the re-encryption unit 105 and the client decryption unit.

The client decryption unit is adapted to the encryption scheme used for the re-encryption. Other than that the client decryption unit may be configured similarly to the decryption unit of the user device 101 which decrypts the content for the first time. Moreover, the client device 106 may likewise be usable as a primary device for accessing protected in addition to its use for decrypting re-encrypted content. In this case, the client device 106 dispose of a decryption unit 103 for decrypting content received from the provider and an additional client decryption unit for decrypting re-encrypted content provided by the user device 101.

Thus, the user device 101 can securely distribute the content to one or more client devices 106 using a content protection scheme which is independent of the protection scheme used by the content provider to distribute the content to the user device 101.

Similarly, the user device 101 may be configured to securely store the content for future playback. For this purpose, the re-encrypted content generated in the re-encryption unit 105 is stored in the memory 107. In order to access the stored content again, the user device 101 does preferably dispose of similar client decryption unit as the client device 106. This client decryption unit decrypts the content and provides the decrypted content for playback. The control word for decrypting the content may be stored together with the content in an encrypted form and read by the client decryption unit from the memory 107. Likewise, it is possible to store the control word separately. In particular, it may be stored in a special file or database managed by the client decryption module, and the client decryption module my access the control word on the basis of a license associated with the content. The encryption and decryption of the control word may again be made on the basis of secret cryptographic key shared between the re-encryption unit 105 and the client decryption unit.

Preferably, the client decryption unit is configured to decrypt the stored content only once. When the content is to be stored again in the memory after decryption, it is preferably re-encrypted again. Thus, the client decryption unit sends the decrypted content to the re-encryption unit 105 which re-encrypts the content for storage as explained above.

The decryption unit 103 and the re-encryption unit 105 are included in a secure hardware environment 108, which is referred to as secure module herein. If the user device 101 disposes of a client decryption unit, this unit is preferably also included in the secure module 108. Moreover, the secure module 108 may include several decryption units 103, where each decryption unit 103 may be assigned to one provider of protected content and may be configured for accessing protected of the respective provider. Similarly, the secure module 108 may include more than one re-encryption unit 105 and/or more than one client decryption unit.

The secure module 108 is configured as a hardware block that includes a processor and memory for securely executing operations including cryptographic and further sensitive operations. The hardware block is preferably separated from further hardware of the user device 101 including one or more processors and memory units for carrying out further functions of the user device 101. In the hardware block, the operations may be implemented by means of a program code, which may be implemented in the secure hardware block at the time of manufacture. The security architecture of the hardware block prevents the program code from being manipulated, and it ensures that the operations executed in the hardware block cannot be manipulated from the outside. From outside the secure module 108, it is only possible to invoke operations and to provide data used in such operations. Moreover, the operation results are provided from the secure module 108 to units outside the secure module 108.

As said above, the operations carried out in the secure module 108 comprise the decryption of the protected content in the decryption unit 103, and may include the re-encryption of the content in the re-encryption unit 105 in case the content is exported. For carrying out these operations, the content as well as the control word for decrypting the content are provided to the secure module 108 from the outside. Upon the decryption of content, the secure module 108 may output the content for playback at the playback unit 104 coupled to or integrated in the user device 101. The transport of the decrypted content to the playback unit 104 and the further processing of the content within the user device 101, such as the decoding of the content, are preferably executed by further secured components of the user device 101 in order to prevent an attacker from recording or otherwise misusing the decrypted content. One example of such a secure component is an HDMI interface for transporting the content to an external playback unit 104.

For re-encrypting the content, the decryption unit 103 forwards the decrypted content to the re-encryption unit 105 within the secure module 108. Then, the re-encryption unit 105 encrypts the content using a new control word which has been provided to the re-encryption unit 105 from outside the secure module 108 or which is generated in the re-encryption unit 105 on the basis of externally provided information. The re-encrypted content outputted by the re-encryption unit 105 does not need to be transported by means of especially secured components. Rather, it can be forwarded to the client device 106 via a conventional network connection and/or it can be stored within the user device 101 in a conventional memory 107 outside the secure module 108.

Further operations that are carried out in the secure module 108 comprise the authentication of information which is sent to the user device 101 in order to facilitate the decryption and re-encryption of the protected content. Moreover, as will be explained in more detail herein below, the secure module 108 is capable of processing usage rights information allocated to the content which define permitted uses of the content. In this regard, the secure module 108 is particular capable of blocking certain uses of the content which are not permitted by the usage rights information.

In addition to the secure module 108, the user device 101 comprises a control unit 109 which controls the operation of the user device 101 with respect to the decryption of content and it is rendering at the playback unit 104. And, if the user device 101 is enabled to re-encrypt the content, the control unit 109 likewise performs a respective control of the user device 101, i.e. it controls the re-encryption operation and the distribution of the re-encrypted content to one or more client device 106 and/or the storage of the re-encrypted content in the user device 101. Thus, the control unit 109 is capable of controlling access operations, which comprise the decryption of the content and its further processing which may particularly include a playback, storage of forwarding of the content. For controlling the operation of the user device 101 with respect to such access operations, for the content, the control unit 109 may include respective functionally separate control units, particularly a decryption control unit 110 and a re-encryption control unit 111. When the user device 101 has a client decryption unit as explained above, the control unit 109 may also include a corresponding client decryption control unit.

The control unit 109 receives user commands and controls their execution. Upon receiving respective user commands, the control unit 109 particularly instructs the secure module 108 to decrypt certain content received in the user device 101. Upon corresponding user commands, it likewise instructs the secure module 108 to re-encrypt content to store it in the memory 107 of the user device 101 and/or to forward the content to one or more client devices 106 specified in the user commands. The instruction to the secure module 108 may be given by corresponding commands which may be sent from the decryption control unit 110 to the decryption unit 103 in the secure module 108 and from the re-encryption control unit 111 to the re-encryption unit 105. The user commands may be entered by means of a suitable input means, such as a remote control unit and/or a keyboard connected to the user device 101. For interacting with the user, the user device 101 may also provide a graphical user interface at the playback unit 104, where the appearance and behavior of the graphical user interface may likewise be controlled by the control unit 109.

In one embodiment, the control unit 109 is configured as a software which is executed on a processor of the user device 101 outside the secure module 108. Compared with the operations executed in the secure module 108, the user device 101 provides a lower degree of security for the control unit 109. So, the control unit 109 may include security mechanisms implemented in the respective software. However, there is no special hardware security architecture for protecting the control unit 109, or the control unit 109 has a significantly lower level of hardware protection compared with the secure module 108. Therefore, the control unit 109 is substantially more sensitive to manipulations than the secure module 108.

Although the user device 101 supports a plurality of uses of the protected content, the user can not dispose of the content with respect to the supported uses without restrictions. Rather, usage rights information (URI) can be provided for the protected content which defines the permitted uses of the content and forbid further uses of the content. By means of such URI, it may e.g. be possible to only allow the direct rendering of the content by means of the playback unit 104 (i.e. to prohibit storage of the content and distribution to further client devices 106), to allow for storing the content and playback the content an unlimited or a limited predefined number of times (i.e. to prohibit only the distribution of the content to further client devices 106) or to allow access operations only for a limited period of time. Of course, these usage rights are only referred to as examples. Some further examples will be described below and the skilled person knows a plurality of further configurations of usage rights for controlling the use of protected content.

With respect to such usage rights, the user device 101 is capable of processing URI which are configured in accordance with a two-layer hierarchy. More specifically, the user device 101 is capable of processing URI comprising a first part that is processed in the secure module 108 and a second part that is processed in the control unit 109. As will be explained in more detail herein below, the first part of the URI corresponds to a predetermined number of basic usage rights corresponding to URI states supported by the secure module 108. In this respect, the definition of complex and sophisticated usage rights and the definition of a great number of states substantially increase the complexity of the secure module 108, and increased complexity of the secure module 108 does typically result in a substantial reduction of its security against manipulations. Therefore, the usage rights defined by the first part of the URI are preferably configured as simple as possible, and these usage rights do preferably correspond to a relatively small number of states. For instance, the number of required states may be between 5 and 15. Exemplary usage rights which may be defined by the first part of the URI will be discussed in more detail below. The second part of the URI can define further usage rights in accordance with the control unit's capabilities for processing such usage rights. As the aforementioned complexity restrictions do not apply to the control unit 109, the usage rights defined by the second part of the URI may particularly be more sophisticated than the usage rights defined by the first part of URI.

In principle, it is possible to include into the second part of the URI any useful usage rights which are supported by the control unit 109. Examples include usage rights for the following uses:

Usage rights for restricting the use of special playback modes such as "fast forward".

Usage rights restricting the number of copies which can be created for the content. As will be explained in more detail below, such usage rights may also be linked with the first part of the URI in such a way that the first part of the URI can be modified when a maximum number of copies is reached.

Usage rights for restricting the output of the content to predefined output interfaces. In particular, the second part of the URI may define that the content can only be outputted via digital output interfaces of the user device 101, but not via any analog output interfaces of the user device 101.

Usage rights which allow access to the content only upon certain user operations. With respect to such usage rights any relevant user operations can be taken into considerations. For instance, such user operations may include a payment made by the user or an input of an access code associated with the content. Further it also possible to allow access to one version of the content, e.g. a low quality version of the content, without restrictions and to allow access to another version of the content, e.g. a high quality version of the content, only upon a user operation.

It may only be allowed to forward the content to client devices that are located within a predetermined geographical area or within a certain maximum distance from the user device 101. Here, the geographical area may include a predetermined country, where the country may be determined on the basis of a corresponding code retrieved from the client device 106, for example. The distance between the user device 101 and the client device 106 can e.g. be determined by means of a so-called proximity control procedure. In such a procedure the distance may particularly be determined on the basis of the delay time required for messages to be transmitted from the user device 101 to the client device 106 and back to the user device 101.

Usage rights which allow the forwarding of the content to certain classes of client devices 106 and prohibit the forwarding of the content to other classes of client devices 106. For example, it may be allowed to forward the content to a further TV set or set-top box, but it may be prohibited to forward the content to personal computers and/or mobile multimedia devices.

The second part of the URI may include usage rights corresponding to copy protection mechanisms which are not supported by the secure module 108. One typical example for such a copy protection mechanism is the Macrovision system, which is often not supported by secure modules 108 included in CPEs.

Of course, the aforementioned usage rights are merely referred to by way of example and the list provided above is by no way exhaustive. The skilled person understands that there are many other usage rights which can be included in the second part of the URI in addition or instead of the aforementioned usage rights.

The URI is preferably provided to the user device 101 by the content provider. During transmission to the user device 101, the URI does not necessarily have to be protected against a discovery by third parties. However, it has to be ensured that the URI is not modified during transmission to the user device 101. For this purpose, the processing of the URI in the decryption unit 103 comprises an explicit or implicit validation of the authenticity and/or integrity of the URI.

In one embodiment, the URI (including the first and second part) is provided to the user device 101 by the provider of the protected content together with the control word for decrypting the protected content. As the control word has to be prevented from being discovered by third parties, it is provided to the user device in an encrypted form and forwarded to the decryption unit 103 within the user device 101. In this embodiment, the control word and the URI may be included in a single encrypted message. The decryption unit 103 decrypts this message and, thus, implicitly verifies that the URI is authentic (i.e. is provided by the content provider). Moreover, protection against modification of the URI is achieved as it is difficult for an attacker to modify the ciphertext in such a way that a meaningful modified URI is generated. The encryption and decryption is preferably made using a secret symmetric key shared between the content provider and the user device 101. However, an asymmetric encryption may likewise be applied.

Protection against modification of the URI can be improved, when the control word and the URI are encrypted using a so-called block cipher mode of operation, such as the cipher-block chaining (CBC) mode of operation. In this implementation, the URI may be the first part of the message, and the control word may be the last part. The message is subdivided into blocks, which may correspond to the URI and the control word or which may be formed in another way, and each block of plaintext is combined (e.g. XORed) with the previous ciphertext block—or with a so-called initialization vector in case of the first block—before being encrypted. Thus, each ciphertext block is dependent on all previous plaintext blocks. Consequently, the ciphertext corresponding to the control word is dependent on the plaintext URI preceding the control word in the message. When the decryption unit 103 decrypts the ciphertext message, it can only recover the correct control word, when the URI part of the message has not been modified. However, if the URI part of the message was modified during transmission, the decryption unit 103 cannot recover the correct control word and, thus, it is not possible to decrypt the protected content. Hence, the recovery of the correct control word allows for implicitly verifying the integrity of the URI.

In alternative embodiment, the URI is not provided to the user device 101 in the same message together with a control word. In such embodiments, it may be provided together with the content or in a further separate message that is linked to the content and/or the control word in a suitable way. Also, in these embodiments, the URI is provided in an encrypted form and/or may be provided along with additional information in such a way that decryption unit 103 can check the URI's integrity and authenticity. Such additional information may include an encrypted message authentication code (MAC) or—in case asymmetric encryption is used in order to protect the communication between the content provider and the user device 101—it may comprise a digital signature, where the MAC or the digital signature may be encrypted using the same key which is used for protecting the control word or the content.

If the decryption unit 103 cannot successfully validate the URI in the validation procedure, it blocks the decryption of the protected content. Thus, it is not possible to render or otherwise access content, when the allocated URI cannot be validated successfully. On the other hand, upon a successful validation of the URI, the decryption unit 103 forwards at least the second part of the URI to the control unit 109, particularly to the decryption control unit 110 allocated to the decryption unit 103. Preferably, the decryption unit 103 does also forward the first part of the URI to the decryption control unit 110. Thus, the complete URI is forwarded to control unit 109.

Further, the decryption unit 103 reads the first part of the URI in order to determine the corresponding usage rights for the content. Similarly, the decryption control unit 110 memorizes the URI in order to be able to check whether desired use of the content is permitted by the usage rights. In this regard, the decryption unit 103 does only check the permission for use operations on the basis of the first part of the URI. Nonetheless, it preferably memorizes the complete URI also including the second part. Likewise, the decryption control unit 110 stores the received URI in order to permit or block use operations on the basis of the URI.

When the decryption control unit 110 receives a user command for a certain use of the protected content, it checks whether this use is permitted by the URI stored in the decryption control unit 110. Thus, the decryption control unit 110 does at least check whether the desired use is permitted by the second part of the URI. If the decryption unit 103 has also forwarded the first part of the URI to the decryption control unit 110, the decryption control unit does preferably also check whether the desired use is permitted by the first part of the URI. If the decryption control unit 110 determines that the desired use is not permitted by the first or second part of the URI, it blocks the use of the content in accordance with the received user command. In this regard, the further processing of the protected content in response to the user command may require a corresponding instruction send from the decryption control unit 110 to the decryption unit 103. In order to block such a further processing, the corresponding command may not be transmitted from the decryption control unit 110 to the decryption unit 103.

If the decryption control unit 110 determines that the desired use is permitted by the second part of the URI and—if available in the decryption control unit 110—by the first part of the URI, the decryption control unit 110 sends to de decryption unit 103 an instructions for the further processing of the protected content in accordance with the desired use. For example, if the user has commanded a playback of the protected content by means of the playback unit 104, the decryption control unit 110 instructs the decryption unit 103 to decrypt the content and to provide the protected content to the playback unit 104 via a corresponding output interface of the secure module 108. Or, if the user has commanded a storage of the content in the memory 107 or a forwarding of the content to the client device 106 in a re-encrypted form, the decryption control unit 110 instructs the decryption unit 103 to decrypt the content and to forward the decrypted content to the re-encryption unit 105.

Upon receipt of the instruction sent by the decryption control unit 110, the decryption unit 103 checks whether the instructed operations are permitted by the first part of the URI. If, this check is affirmative, i.e. if the first part of the URI permits the instructed operations, the decryption unit 103 executes these operations. On the other hand, if the check is negative, i.e. if the first part of the URI does not permit the instructed operations, these operations are not executed by the decryption unit 103.

When the instructed operation comprises a direct playback of the content by means of the playback unit 104, the decryption unit 103 may forward the content together with the first part of the URI and preferably also with the second part of the URI. Using the forwarded URI, the interface for forwarding the content to the playback unit 104 may be configured. The corresponding control of the interface may be performed by a function included in the control component of the interface. For example, this control component may operate the interface in a protected mode of operation when the URI includes predefined usage restrictions, and it may operate the interface in an unprotected mode of operation when such restrictions are not defined in the URI. Such control of the interface can particularly be implemented when the output interface comprises a HDMI which supports a protected and an unprotected mode of operation.

When the instructed operation comprises an export including a forwarding of the content decrypted in the decryption unit 103 to the re-encryption unit 105, the URI is likewise forwarded together with the content and processed in the re-encryption unit 105 and the related re-encryption control unit 111. In the processing, it is checked whether the instructed export mode, i.e. a storage of the re-encrypted content in the memory 107 or a forwarding of the protected content to a certain client device 106, is permitted by the URI. Again, this check is made in the re-encryption control unit 111 at least with respect to the usage rights defined by the second part of the URI. Preferably, the re-encryption control unit 110 does also check whether the instructed export operation is permitted by the first part of the URI. When the re-encryption control unit 111 determines that an instructed export operation is permitted by the checked URI (i.e. the second part and possibly also the first part of the URI), the re-encryption control unit 111 transmits a command to execute the export operation in accordance with the selected export mode to the re-encryption unit 105. Then, the re-encryption unit 105 checks whether the instructed export operation is permitted by the first part of the URI similarly to the check made in the decryption unit 103 on the basis of the first part of the URI. If this check by the re-encryption unit 105 is affirmative, the re-encryption unit 105 executes the instructed operation. Otherwise, the instructed export of the content is blocked.

In order to carry out the checks, the re-encryption control unit 111 and the re-encryption unit 105 are provided with the first and second part of the URI. In particular, the URI or least its first part is forwarded from the decryption unit 103 to the re-encryption unit 105 together with the content. Moreover, the second part of the URI and—if processed in the re-encryption control unit 111—also the first part may be passed from the decryption control unit 110 to the re-encryption control unit 111, when the content is forwarded from the decryption unit 103 to the re-encryption unit 105. As an alternative, the re-encryption unit 105 may provide the second part and possibly the first part of the URI to the re-encryption control unit 111 upon receipt of the URI from the decryption unit 103.

When the re-encryption unit 105 exports the content, it also exports the URI. Depending on the export mode, the re-encryption unit 105, stores the URI together with the content or forwards the URI to the client device 106 together with the content. Preferably, the complete URI is stored or forwarded by the re-encryption unit 105. When the content is read from the memory 107 or accessed in the client device 106, the URI is processed in order to check whether the desired uses of the content are permitted by the URI in a similar way as the check is carried out in the user device 101. In order to prevent manipulation of the URI while it is stored in the memory 107 or during transmission to the client device 106, the re-encryption unit 105 encrypts the URI and/or generates additional validation information which is used in the client device 106 or when accessing the stored content.

The protection of the URI pertaining to the re-encrypted content against manipulation may be made in the same way as the protection of the original URI provided to the user device 101. Thus, the re-encryption unit 105 may encrypt the URI together with the control word used for re-encrypting the content or it may generate a validation information that may include a MAC or a digital signature of the URI which may be encrypted using the same key that is also used for encrypting the control word. As an alternative, the URI or the validation information may also be encrypted together with the content instead of the control word.

As explained above, the decryption of the re-encrypted content is made using a decryption unit in the client device 106 or the user device 101. When the respective client decryption unit accesses the re-encrypted content, the URI is validated with respect to authenticity and integrity similar to the validation of the original URI in the user device 101 explained above. Thereupon, the content is only decrypted and provided for playback and/or further storage, when the validation of the URI has been successful.

In addition to the aforementioned processing of the URI, in which it is checked whether an instructed use operation is permitted by the usage rights defined by the URI, the units of the user device 101 may also be capable of modifying the URI. Here, the units included in the secure module 108 may be enabled to modify the first part of the URI and the units included in the control unit 109 may be enabled to modify the second part of the URI. Further, the units comprised in the control unit 109 may be enabled to modify the first part of the URI under certain circumstances which will be described in more detail herein below.

Modifications of the URI may particular be made in response to a certain use operation, when such use operation gives rise to a modification of the usage rights. In this regard, the usage rights may particularly define a maximum number of times a particular use operation is allowed to be carried out. In particular, the URI may define that the protected content can be stored in the memory 107 of the user device 101 and read from the memory 107 in order to be played back a limited number times specified in the first or second part of the URI. If the specified maximum number of reading operations is achieved, the secure module 108 or the control unit 109 may change the URI such that a further storage of the content in the memory 107 is no longer permitted.

In addition or as an alternative, modifications of the URI may be made in dependence of the selected mode for the export of the content. In one particular example for such modification, it may be allowed to forward the content between a limited or unlimited number of devices. Thus, it may be allowed to forward the content from the user device 101 to a client device 106, and the client device 106 may be allowed to further distribute the content to other device and so forth. However, it may be allowed to store one copy of the content, i.e. only one of the devices may be allowed to export the content in the storage mode.

In order to achieve this, the URI may include a first usage right permitting to store one copy of the content and to forward the content to a client device 106 and a second usage right may only allow for forwarding the content to another client device 106 without permitting storing. The original URI for the content may include the first usage right, and when the user device 101 receives an instruction to store the content, it may follow this instruction and additionally modify the URI to include the second instead of the first usage right. Thus, when the content is additionally forwarded to the client device 106, the client device 106 will not be allowed to store a further copy of the content due to the modification of the URI.

The aforementioned usage rights are preferably defined in the first part of the URI. Moreover, the change of the URI is preferably made in the re-encryption unit 105 when it exports the content for storage in the memory 107. Here, the re-encryption unit 105 may perform the modification on its own initiative, when it determines that the content is exported for storage, or the modification may be instructed by the re-encryption control unit 111. The modification may be made automatically due to a corresponding pre-configuration of the re-encryption unit 105 or the re-encryption control unit 111.

In order prevent the first part of the URI from being manipulated in fraudulent intent, modifications of the first part of the URI can preferably only be made in secure module 108. However, as said above it may be possible for the control unit 109 to initiate modifications of the first part of URI. In one embodiment, such modifications are allowed, if they change the first part of the URI such that the modified usage rights correspond to a URI state which is more restrictive than the URI state corresponding to the unmodified usage rights. In order to ensure that only such modifications can be made on the initiative of the control unit 109, the URI states implemented in the secure module 108 may be ordered in accordance with the restriction imposed by these URI states. In this order, the more restrictive URI states may have higher order numbers so that the order number 1 pertains to the less restrictive URI state and the highest order number pertains to the most restrictive URI state.

In order to effect a modification of the first part of URI, the control unit 109 transmits a corresponding instruction to the secure module 108. Upon receipt of this instruction the secure module 108 checks whether the modification includes a change from the current URI state to a higher ordered URI state. If the secure module 108 determines that the desired new URI state has a higher order than the current URI state, it modifies the first part of the URI accordingly. Otherwise, it rejects the received instructions, and no modification of the first part of the URI is made.

In principal, any modification of the first part of the URI that fulfils the aforementioned criteria can be effected by the control unit 109. Moreover, it is possible to define any criteria for initiating such modification in the control unit 109. In one exemplary application of the aforementioned mechanism, the control unit 109 keeps track of the number of times the content is read from the memory 107 for playback and prevents a further storage when a maximum number of times has been reached. In this example, the first part of the original URI may permit that the content can be stored an infinite number of times. On the other hand, the second part of the original URI may define that the content can be stored and read N times. In this configuration, the control unit 109 keeps track of the number of times the content is stored. For this purpose, the control unit 109 may decrement the number of times the content can still be stored each time it determines the storage of the content. When the control unit 101 determines that the maximum number of storage operations has been reached, it instructs secure module 108 to change the first part of the URI in such a way that it is no longer allows for storing the content.

This example shows that the suggested two-layer hierarchy particularly allows for defining interrelated usage rights in the first and second parts of the URI such that the basic usage rights (i.e. unlimited and no storage of the protected content in the aforementioned example) can be defined in the first part of the URI which can be processed in the secure module 109 without having to implement complex functionality in the secure module 108. Usage rights which require such functionality (i.e. the definition of a maximum number of storage operations in the aforementioned example) can be defined in the second part of the URI which are processed in the control unit 109.

In the example explained above, the first part of the URI does only include usage rights corresponding to states in which the storage of the content is not restricted or in which storage is not allowed at all. However, it is likewise possible that the first part of the URI includes usage rights corresponding to URI states which allow for storing the content once. This means that it is not permitted to store the content again after it has been read from the memory 107. The secure module 108 may change such URI states to new states which no longer allow for storing the content, when it re-encrypts the content for storing the content in the memory 107 of the user device 101. Thus, such URI states can also be handled within the secure module 108 without having to implement complex functionality. In particular such a state can also be handled without having to keep track of the number of storage operations executed for the content.

One example of a set of URI states in accordance with the aforementioned embodiment will be now given herein below:

1. All permitted: In this URI state, any access operation supported by the user device 101 can be carried out for the content. The URI state does not impose any restrictions to the use of the content.
2. Storing permitted multi-generation: In accordance with this URI state, it is possible to render the content by means of the playback unit 104 of the user device 101. Moreover, it is permitted to forward the protected content to one or more client devices 106 in order to render the content using such client devices 106 and/or to store the protected content in the client devices 106. Further, it is permitted to store the content in the memory 107 of the user device 101 in a re-encrypted form.
3. Storing permitted one generation: In contrast to the second URI state "storing permitted multi-generation" this URI state does only allow for storing the protected content once in the user device 101 or in the client device 106.
4. Storing permitted one generation on present device: Compared with the preceding URI state "storing permitted one generation" this URI state is further limited in that storing of the content in a re-encrypted form is only permitted in the user device 101. Storing in a client device 106 receiving content forwarded in a re-encrypted form is not permitted in this URI state.

5. Streaming only: This URI state permits a rendering of the content by means of the playback unit 104 integrated in or coupled to the user device 101. Further, it is permitted to forward the content one or more client devices 106 in a re-encrypted form in order to render the content using such client devices 106. However, this URI state does not allow for storing the protected content in the user device 101 or in the client devices 106.

6. Direct view only: Compared with the preceding URI state "Streaming only", this URI state is further restricted in that it is only permitted to playback the protected content by means of the playback unit 104 coupled to or integrated in the user device 101. It is not permitted to forward the protected content to any client device 106. Moreover, storage of the protected content is not permitted as in the preceding URI state.

7. No viewing permitted: This is the most restrictive URI state which does not allow for rendering the protected content by means of the playback unit 104 or using a client device 106. Further, storing of the protected content in the memory 107 of the user device 101 or in a client device 106 is not permitted.

When this exemplary set of URI states is used, transitions are possible from the states 3 and 4 to the states 5 and 6. So, when the first part of the original URI information defines usage rights corresponding to the $3^{rd}$ state "Storing permitted one generation", the secure module 108 may change to the $5^{th}$ state "Streaming only" or the $6^{th}$ state "Direct view only", when it re-encrypts the protected content in order to store the re-encrypted content in the memory 107 of the user device 101. In so doing, the secure module 108 does preferably modify the first part of the URI information accordingly and provides the modified URI information for storage. Whether the $5^{th}$ or the $6^{th}$ state is selected, may be defined in the original URI information, particularly in the first part. For this purpose, the first part of the URI information may either define a first sub-state 3a which corresponds to the state 3 and defines a transition to state 5, or the URI information defines a sub-state 3b which corresponds to the state 3 and provides a transition to the state 6. As an alternative, the transition may be preconfigured in the secure module 108. In this regard, the automatic change from the first to the second usage rights in dependence of the export mode in the example described above may particularly be implemented as an automatic change from state 3 to state 5.

In a similar way, the secure module 108 may change from the state 4 "Storing permitted one generation on present device" to the state 5 or 6, when it re-encrypts the content for storing the re-encrypted content in the memory 107 of the user device 101. Also, in this case the URI information may define whether a transitions is to be made to the state 5 "Streaming only" (for this purpose, a sub-state 4a may be defined) or whether the transition is to be made to the state 6 "Direct view only" (for this purpose a sub-state 4b may be defined). As an alternative, the transition may again be preconfigured in the secure module 108.

Furthermore, the URI may include time limits for the permitted use operations. In this embodiment, some or all of the usage rights included in the first or second part of the URI may define a time period during which the use operations permitted by the respective usage rights are allowed to be executed. Upon expiry of the time limit the use is no longer permitted and is blocked. In one embodiment, the time limits are included in the first part of the URI and a check whether the time limit is expired is particularly made in the secure module 108. More specifically, the decryption unit 104 may check whether the time limit is expired when it accesses the content and receives and instruction to provide the content for direct playback or to forward the content to the re-encryption unit 105. When it determines that the time limit is expired it may block the requested operation. Otherwise, the operation may be carried by the decryption unit 104. In addition to the secure module 108, the control unit 109 may also check whether the time limit has been expired on the basis of the first part of the URI, when the first part of the URI is provided to the control unit 109 as explained above.

In order to the check whether the time limit has been expired, the decryption unit 104 preferably retrieves time information from a time server. The time server to be used may be specified in configuration information of the decryption unit 104 stored in the secure module 108. If the secure module includes a plurality of decryption units 104, one time server 104 may be allocated to each decryption unit 104 separately. Thus, the decryption units 104 may use different time servers. The time server to be accessed by a decryption unit 104 may be specified by the content provider to which the decryption unit 104 is assigned, i.e. the provider the content of which is accessed by means of the decryption unit 104.

Preferably, the time information is retrieved from the time server using a secure protocol. In particular, the decryption unit 104 may verify the identity of the time server. This verification may be made on the basis of a digital signature created by the time server which may be verified using a digital certificate provided in the decryption unit 104. Moreover, the decryption unit can generate a so-called nonce, i.e. a number used once, and include the nonce into the request for receiving the time information. The time server may also include the nonce into the response to the request. By comparing the nonce received in the response with the generated nonce, which is temporarily stored in the secure module 108 for carrying out the comparison, the decryption unit can verify the freshness of the time information and use only fresh time information. In particular, the decryption unit 104 may use the time information when the received nonce corresponds to the generated nonce. Otherwise, the decryption unit 104 may not use the time information and may block the decryption of content.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

Various embodiments are described in the following clauses.

1. Device for accessing protected content, the device comprising a secure module for accessing the protected content and a control unit external to the secure module for controlling access operations for the protected content,
   wherein the device is configured to receive usage rights data for the protected content, the usage rights data including first and second usage rights data defining permissions for uses of the protected content, and
   wherein the device is configured to enable a requested use of the protected content upon a check whether the use is permitted by usage rights data, the check being made in the secure module based on to the first usage rights data and the check being made in the control unit based on the second usage rights data.

2. Device as in clause 1, wherein the device is configured such that the check performed in the secure module based on the first usage rights data is made subsequent to the check in the control unit performed based on the second usage rights data.

3. Device as in clause 2, wherein the check performed in the secure module based on the first usage rights data is only made, if the check performed in the control unit based on the second usage rights data is affirmative.

4. Device according to one of the preceding clauses, wherein the control unit is configured to perform a first check whether the use is permitted based on the first usage rights data and the secure module is configured to perform a subsequent second check whether the use is permitted based on to the first usage rights data, the use being enabled if the first and second checks are affirmative.

5. Device as in clause 4, configured to block the use, if one of the first and second check is negative, the second check only being made, if the first check is affirmative.

6. Device according to one of the preceding clauses, wherein the secure module is configured to validate the first and second usage rights data and to forward at least the second usage rights data to the control unit upon a successful validation of the first and second usage rights data.

7. Device according to one of the preceding clauses, wherein the first usage rights data define permissions for a predetermined set of uses of the content, the uses corresponding to a predetermined set of states of the secure module, and wherein the set of states cannot be modified.

8. Device according to one of the preceding clauses, wherein the secure module is configured to modify the first usage rights data in response to an access operation for the content carried out in the device.

9. Device according to one of the preceding clauses, wherein the control unit is configured to modify the second usage rights data in response to an access operation for the content carried out in the device.

10. Device according to one of the preceding clauses, wherein the control unit is configured to send an instruction to modify the first usage rights data to the secure module, and wherein the secure module is configured to modify the first usage rights data in accordance with the instruction.

11. Device according to one of the preceding clauses, wherein the secure module is capable of exporting the content in accordance with a first export mode for storing the content in the device and in accordance with a second export mode for forwarding the content to a further device, and wherein the device is configured to modify the first and/or second usage rights data in dependence of a selected mode for exporting the content.

12. Device according to one of the preceding clauses, wherein the states of the secure module corresponding to the first usage rights data are ordered, and wherein the secure module is configured to modify the first usage rights data when the modification includes a change to usage rights which correspond to a higher ordered state than a current state.

13. Device according to one of the preceding clauses, wherein the first part of the usage rights data defines at least one time limit for a permitted use, and wherein the secure module is adapted to retrieve time information from at least one predetermined time server and to check an expiration of the time limit using the time information.

14. Device as in clause 13, wherein the secure module comprises a plurality of units for accessing the protected content and wherein the units are configured to retrieve time information from different time servers.

15. Method for operating a device for accessing protected content, the device comprising a secure module for accessing the protected content and a control unit external to the secure module for controlling access operations for the protected content,
   wherein the method comprises the steps of:
      receiving usage rights data for the protected content, the usage rights data including first and second usage rights data defining permissions for uses of the protected content, and
      enabling a requested use of the protected content upon a check whether the use is permitted by the usage rights data, the check being made in the secure module based on to the first usage rights data and the check being made in the control unit based on the second usage rights data.

The invention claimed is:

1. A device for accessing protected content, the device comprising:
   a memory;
   a processor;
   a secure application configured to access the protected content;
   a controller external to the secure application configured to control access operations for the protected content; and
   a receiver configured to receive usage rights data for the protected content, the usage rights data including first and second usage rights data, each of the first and second usage rights data defining respective permissions for uses of the protected content;
   the secure application further configured to:
   perform a first check upon the received first usage rights data to determine if a requested use of the protected content is permitted;
   the controller further configured to:
   perform a second check upon the received second usage rights data to determine if the requested use of the protected content is permitted;
   the processor of the device further configured to:
   enable the requested use of the protected content if the results of both the first check to determine if the requested use of the protected content is permitted that is performed by the secure application and the second check to determine if the requested use of the protected content is permitted that is performed by the controller both result in determining that the requested use of the protected content is permitted;
   wherein the processor of the device is configured such that the first check to determine if the requested use of the protected content is permitted performed by the secure application, is performed subsequent to the second check to determine if the requested use of the protected content is permitted performed by the controller, wherein the first check to determine if the requested use of the protected content is permitted performed by the secure application, is only performed if the second check to determine if the requested use of the protected content is permitted performed by the controller is affirmative, wherein states of the secure application corresponding to the first usage rights data are ordered, and wherein the secure application is configured to modify the first usage rights data when the modification includes a change to usage rights which correspond to a higher ordered state of the secure application than a current state.

2. The device according to claim 1, wherein the controller is configured to perform a third check whether the use is permitted based on the first usage rights data and the secure application is configured to perform the first check subsequently to the third check, the use being enabled if the first and third checks are affirmative.

3. The device according to claim 2, wherein the processor of the device is configured to block the use, if one of the first, second or third checks is negative, the first check only being made, if the third check is affirmative.

4. The device according to claim 1, wherein the secure application is configured to validate the first and second usage rights data and to forward at least the second usage rights data to the controller upon a successful validation of the first and second usage rights data.

5. The device according claim 1, wherein the first usage rights data define permissions for a predetermined set of uses of the content, the uses corresponding to a predetermined set of states of the secure application, and wherein the set of states cannot be modified.

6. The device according to claim 1, wherein the secure application is configured to modify the first usage rights data in response to an access operation for the content carried out in the device.

7. The device according to claim 1, wherein the controller is configured to modify the second usage rights data in response to an access operation for the content carried out in the device.

8. The device according to claim 1, wherein the controller is configured to send an instruction to modify the first usage rights data to the secure application, and wherein the secure application is configured to modify the first usage rights data in accordance with the instruction.

9. The device according to claim 1, wherein the secure application is configured to export the content in accordance with a first export mode for storing the content in the device and in accordance with a second export mode for forwarding the content to a further device, and wherein the processor of the device is configured to modify the first, second, or both usage rights data in dependence of a selected mode for exporting the content.

10. The device according to claim 1, wherein a first part of the usage rights data defines at least one time limit for a permitted use, and wherein the secure application is configured to retrieve time information from at least one predetermined time server and to check an expiration of the time limit using the time information.

11. The device according to claim 10, wherein the secure application comprises a plurality of instructions for accessing the protected content and wherein the instructions are configured to retrieve time information from different time servers.

12. A method for operating a device for accessing protected content, comprising:
  accessing the protected content by a secure application of the device;
  controlling access operations for the protected content by a controller external to the secure application;
  receiving, at a receiver of the device, usage rights data for the protected content, the usage rights data including first and second usage rights data, each of the first and second usage rights data defining respective permissions for uses of the protected content;
  performing, by the secure application, a first check upon the received first usage rights data to determine if a requested use of the protected content is permitted;
  performing, by the controller, a second check upon the received second usage rights data to determine if the requested use of the protected content is permitted; and
  enabling, by a processor of the device, the requested use of the protected content if the results of both the first check to determine if the requested use of the protected content is permitted that is performed by the secure application and the second check to determine if the requested use of the protected content is permitted that is performed by the controller both result in determining that the requested use of the protected content is permitted,
  wherein the first check to determine if the requested use of the protected content is permitted that is performed by the secure application, is performed subsequent to the second check to determine if the requested use of the protected content is permitted that is performed by the controller,
  wherein the first check to determine if the requested use of the protected content is permitted that is performed by the secure application, is only performed if the second check to determine if the requested use of the protected content is permitted that is performed by the controller is affirmative,
  wherein states of the secure application corresponding to the first usage rights data are ordered, and
  wherein the secure application modifies the first usage rights data when the modification includes a change to usage rights which correspond to a higher ordered state of the secure application than a current state.

13. A device for accessing protected content, the device comprising:
  a memory;
  a processor;
  a secure application configured to access the protected content;
  a controller external to the secure application configured to control access operations for the protected content; and
  a receiver configured to receive usage rights data for the protected content, the usage rights data including first and second usage rights data, each of the first and second usage rights data defining respective permissions for uses of the protected content;
  the secure application further configured to:
  perform a first check upon the received first usage rights data to determine if a requested use of the protected content is permitted;
  the controller further configured to:

perform a second check upon the received second usage rights data to determine if the requested use of the protected content is permitted;

the processor of the device further configured to:

enable the requested use of the protected content if the results of both the first check to determine if the requested use of the protected content is permitted that is performed by the secure application and the second check to determine if the requested use of the protected content is permitted that is performed by the controller both result in determining that the requested use of the protected content is permitted;

wherein the controller is configured to perform a third check upon the received first usage rights data to determine if the requested use of the protected content is permitted and the secure application is configured to perform the first check upon the received first usage rights data to determine if the requested use of the protected content is permitted, subsequently to the third check, the requested use of the protected content being enabled if the first and third checks are affirmative, wherein the processor of the device is configured to block the requested use of the protected content, if one of the first, second or third checks is negative, the first check only being made, if the third check is affirmative, wherein states of the secure application corresponding to the first usage rights data are ordered, and wherein the secure application is configured to modify the first usage rights data when the modification includes a change to usage rights which correspond to a higher ordered state of the secure application than a current state.

14. A method for operating a device for accessing protected content, comprising:

accessing the protected content by a secure application of the device;

controlling access operations for the protected content by a controller external to the secure application;

receiving, at a receiver of the device, usage rights data for the protected content, the usage rights data including first and second usage rights data, each of the first and second usage rights data defining respective permissions for uses of the protected content;

performing, by the secure application, a first check upon the received first usage rights data to determine if a requested use of the protected content is permitted;

performing, by the controller, a second check upon the received second usage rights data to determine if the requested use of the protected content is permitted; and enabling, by a processor of the device, the requested use of the protected content if the results of both the first check to determine if the requested use of the protected content is permitted that is performed by the secure application and the second check to determine if the requested use of the protected content is permitted that is performed by the controller both result in determining that the requested use of the protected content is permitted, wherein the controller performs a third check upon the received first usage rights data to determine if the requested use of the protected content is permitted and the secure application is configured to perform the first check upon the received first usage rights data to determine if the requested use of the protected content is permitted, subsequently to the third check, the requested use of the protected content being enabled if the first and third checks are affirmative, wherein the processor of the device executes instructions to block the requested use of the protected content, if one of the first, second or third checks is negative, the first check only being made, if the third check is affirmative, wherein states of the secure application corresponding to the first usage rights data are ordered, and wherein the secure application modifies the first usage rights data when the modification includes a change to usage rights which correspond to a higher ordered state of the secure application than a current state.

\* \* \* \* \*

UNITED STATES PATENT AND TRADEMARK OFFICE
CERTIFICATE OF CORRECTION

PATENT NO. : 9,740,834 B2
APPLICATION NO. : 14/836364
DATED : August 22, 2017
INVENTOR(S) : Marnix Vlot and Christoph Schaaf

It is certified that error appears in the above-identified patent and that said Letters Patent is hereby corrected as shown below:

In the Claims

Column 21, Line 33, please correct Claim 5 as follows:

5. The device according to claim 1, wherein the first usage rights data define permissions for a predetermined set of uses of the content, the uses corresponding to a predetermined set of states of the secure application, and wherein the set of states cannot be modified.

Signed and Sealed this
Nineteenth Day of June, 2018

Andrei Iancu
*Director of the United States Patent and Trademark Office*